US012760044B2

(12) United States Patent
Mudaliar et al.

(10) Patent No.: US 12,760,044 B2
(45) Date of Patent: Oct. 13, 2026

(54) METHOD FOR OBTAINING L-GLUFOSINATE

(71) Applicant: UPL LIMITED, Mumbai (IN)

(72) Inventors: Chandrasekhar Dayal Mudaliar, Mumbai (IN); Ashishkumar Ravindra Mishra, Mumbai (IN); Mukesh Deshmukh, Mumbai (IN); Prashant Kini, Mumbai (IN)

(73) Assignee: UPL LIMITED, Mumbai (IN)

( * ) Notice: Subject to any disclaimer, the term of this patent is extended or adjusted under 35 U.S.C. 154(b) by 295 days.

(21) Appl. No.: 18/566,477

(22) PCT Filed: Jun. 10, 2022

(86) PCT No.: PCT/IN2022/050536
§ 371 (c)(1),
(2) Date: Dec. 1, 2023

(87) PCT Pub. No.: WO2022/259267
PCT Pub. Date: Dec. 15, 2022

(65) Prior Publication Data

US 2024/0270768 A1 Aug. 15, 2024

(30) Foreign Application Priority Data

Jun. 11, 2021 (IN) ............................. 202121026145

(51) Int. Cl.
*C07F 9/30* (2006.01)
*A01N 57/20* (2006.01)
*A01P 13/00* (2006.01)

(52) U.S. Cl.
CPC .............. *C07F 9/301* (2013.01); *A01N 57/20* (2013.01); *A01P 13/00* (2021.08)

(58) Field of Classification Search
CPC ............................ A01N 57/20; C07B 2200/07
See application file for complete search history.

(56) References Cited

U.S. PATENT DOCUMENTS 5,767,309 A 6/1998 Knorr et al.
5,869,668 A * 2/1999 Knorr .................. C07C 227/36 546/35

FOREIGN PATENT DOCUMENTS

AU 778206 B2 11/2004
WO 2018108797 A1 6/2018
WO 2020214631 A1 10/2020

OTHER PUBLICATIONS

Office Action of the corresponding Bolivia application No. SP-00111-2022 dated Jan. 31, 2025.
Examination Report for Pakistan Patent Application No. 0377/2022, Date of Mailing: Feb. 26, 2024; 2 pages.
Office Action for the corresponding Bolivian Application No. SP 111-2022, Dated: Jul. 15, 2025; 6 pages (English translation).
Examination Report for Indian Patent Application No. 202422010708, Date of Mailing: Nov. 17, 2025; 6 pages.
First Examination Report for Indian Patent Application No. 202121026145, Date of Mailing: May 23, 2023; 5 pages.

* cited by examiner

*Primary Examiner* — Gina C Justice
(74) *Attorney, Agent, or Firm* — CANTOR COLBURN LLP

(57) ABSTRACT

The present invention relates to a safer, easier and cost-effective method for preparing L-glufosinate or salts thereof. The present invention further relates to a novel L-glufosinate quinine tetrahydrate salt and its use in a method for obtaining L-glufosinate or salts thereof.

16 Claims, 2 Drawing Sheets

METHOD FOR OBTAINING L-GLUFOSINATE

CROSS REFERENCE TO RELATED APPLICATIONS

This application is a U.S. National Stage application of PCT/IN2022/050536, filed Jun. 10, 2022, which claims the benefit of Indian Patent Application number 202121026145 filed Jun. 11, 2021, both of which are incorporated by reference in their entireties herein.

FIELD OF THE INVENTION

The present invention relates to a safer, easier and cost-effective method for preparing L-glufosinate or salts thereof. The present invention further relates to a novel L-glufosinate quinine tetrahydrate salt and its use in a method for obtaining L-glufosinate or salts thereof.

BACKGROUND OF THE INVENTION

Glufosinate is a non-selective herbicide belonging to the group of organophosphate and has been widely used around the world. It is generally used in the form of ammonium salt for total vegetation control and to control growth of weeds and grasses. Glufosinate is used as a racemic mixture of L- & D-glufosinate. However, it is well known that L-glufosinate i.e. (S)-2-amino-4-(hydroxy(methyl)phosphonoyl)butanoic acid) is much more potent than D-glufosinate.

Mainly there are three methods known in prior art for preparing optically pure L-glufosinate, namely by asymmetric chemical synthesis, by biocatalysis and by chiral separation.

The chemical synthesis method is based on the synthesis of optically pure L-glufosinate, which is more common in laboratory research. One such process is provided in Journal of Organic Chemistry, 1991, 56: 1783-1788, however such processes involve many steps and provide low yield, and the asymmetric synthetic reagents used are mostly expensive, resulting in high production cost, which is not feasible for large-scale production of L-glufosinate.

The biocatalysis synthesis method involves use of protein molecules or enzymes. The protein molecules are unstable and technically difficult to separate from final products. The enzymes are known to be very sensitive and may be inactivated by higher temperature, extreme pH-values, higher salt concentration or even by organic solvents. Hence, even this method is not suitable for large scale production.

Yet another method is chiral separation method, one of such methods is provided in WO1995023805 wherein an industrial scale resolution method of racemic glufosinate or their salts using the chiral bases like quinine, cinchonine, cinchonidine or brucine is disclosed. The process described in said application involves dissolving the salt of the chiral base and L-glufosinate in an alcoholic solvent and treatment with alcoholic ammonia due to which L-glufosinate ammonium salt precipitates out. The L-glufosinate ammonium salt is isolated by filtration, the filtrate i.e. the mother liquor obtained essentially contains chiral base which can be used in another batch. In this process the possibility of substantial loss of yield of L-glufosinate salt during precipitation from mother liquor cannot be denied. It is well known that the small loss in yield of final product on industrial scale is in fact of high significance. Also, the step of isolation of L-glufosinate ammonium requires use of an additional organic solvent. This indirectly increases the production cost of final product and also adversely affects the environment.

It is therefore, required to develop a process, which is feasible on industrial scale, involves lesser number of steps, is advantageous from a process engineering and economic point of view and is environment friendly.

OBJECT OF THE INVENTION

The main object of the present invention is to provide L-glufosinate from racemic glufosinate without requiring isolation of L-glufosinate salt, which can be used for preparation of various formulations.

Another object of the present invention is to provide a method for obtaining L-glufosinate, from racemic glufosinate without requiring isolation of L-glufosinate salt.

Yet another object of present invention is to provide a safer, easier and cost-effective method for obtaining L-glufosinate.

Yet another object of present invention is to provide a stable L-glufosinate quinine tetrahydrate salt.

Yet another object of present invention is to provide a method for obtaining a stable L-glufosinate quinine tetrahydrate salt.

SUMMARY OF THE INVENTION

According to an aspect of present invention, there is provided a method for obtaining L-glufosinate or its salt from racemic glufosinate without requiring isolation of solid L-glufosinate salt.

According to an aspect of present invention, there is provided a method for obtaining L-glufosinate or its salt, said method comprising separating L-glufosinate from a salt of L-glufosinate and chiral base.

In another aspect, the salt of L-glufosinate and chiral base is prepared by reacting racemic glufosinate or its salt with a chiral base.

In another aspect, L-glufosinate is separated from a salt of L-glufosinate and chiral base by dissolving the salt of L-glufosinate and the chiral base in water and adjusting pH to 6 to 9 with a base to precipitate the chiral base; and removing the precipitated chiral base.

In an embodiment, L-glufosinate is separated in the form of a concentrated aqueous L-glufosinate salt solution.

According to an aspect of present invention, there is provided a method for obtaining L-glufosinate or salts thereof, said method comprising:

a) reacting glufosinate or its salt with a chiral base to obtain a salt of L-glufosinate and chiral base;
b) dissolving said salt of L-glufosinate and chiral base in water and adjusting pH to 6 to 9 with a base to precipitate the chiral base; and
c) removing said precipitated chiral base to obtain L-glufosinate or salts thereof.

According to an aspect of present invention, there is provided a method for obtaining L-glufosinate, said method comprising separating L-glufosinate from L-glufosinate quinine tetrahydrate salt.

In an embodiment, the L-glufosinate quinine tetrahydrate salt is prepared by reacting racemic glufosinate or its salt with quinine.

In an embodiment, L-glufosinate is separated from L-glufosinate quinine tetrahydrate salt by dissolving the L-glufosinate quinine salt in water and adjusting pH to 6 to 9 with a base to precipitate quinine; and removing the precipitated quinine.

In an embodiment, L-glufosinate is separated in the form of a concentrated aqueous L-glufosinate salt solution.

According to an aspect of present invention, there is provided a method for obtaining L-glufosinate or salts thereof, said method comprising:

a) reacting glufosinate or its salt with quinine to obtain L-glufosinate quinine tetrahydrate salt;
b) dissolving said L-glufosinate quinine tetrahydrate salt in water and adjusting pH to 6 to 9 with a base to precipitate quinine; and
c) removing said precipitated quinine to obtain L-glufosinate or salts thereof.

According to another aspect of present invention, there is provided a method for obtaining L-glufosinate ammonium, said method comprising a) reacting racemic glufosinate or its salt with quinine in presence of a catalyst and a solvent to obtain L-glufosinate quinine tetrahydrate salt;
b) dissolving said L-glufosinate quinine tetrahydrate salt in water and adjusting pH to 6 to 9 with ammonia to precipitate quinine; and
c) removing said precipitated quinine to obtain L-glufosinate ammonium solution.

According to another aspect of present invention, there is provided a method for obtaining L-glufosinate quinine tetrahydrate salt, said method comprising:

a) reacting racemic glufosinate or its salt with quinine in presence of a catalyst and a solvent consisting of mixture of water and tert-butanol wherein the ratio of water:tert-butanol is in the range of 10:90 to 15:85 volumes; and
b) cooling the reaction mixture and isolating the L-glufosinate quinine tetrahydrate salt.

According to yet another aspect of present invention, there is provided L-glufosinate quinine tetrahydrate salt.

According to yet another aspect of the present invention, there is provided L-glufosinate quinine tetrahydrate salt, further characterized by having $D_{50}$ particle size value of less than 45 μm. In an embodiment L-glufosinate quinine tetrahydrate salt having $D_{50}$ particle size value of less than 30 μm.

According to yet another aspect of the present invention, there is provided L-glufosinate quinine tetrahydrate salt having bulk density of about 0.3 gm/ml to about 0.7 gm/ml.

DETAILED DESCRIPTION OF THE INVENTION

Figure 1:
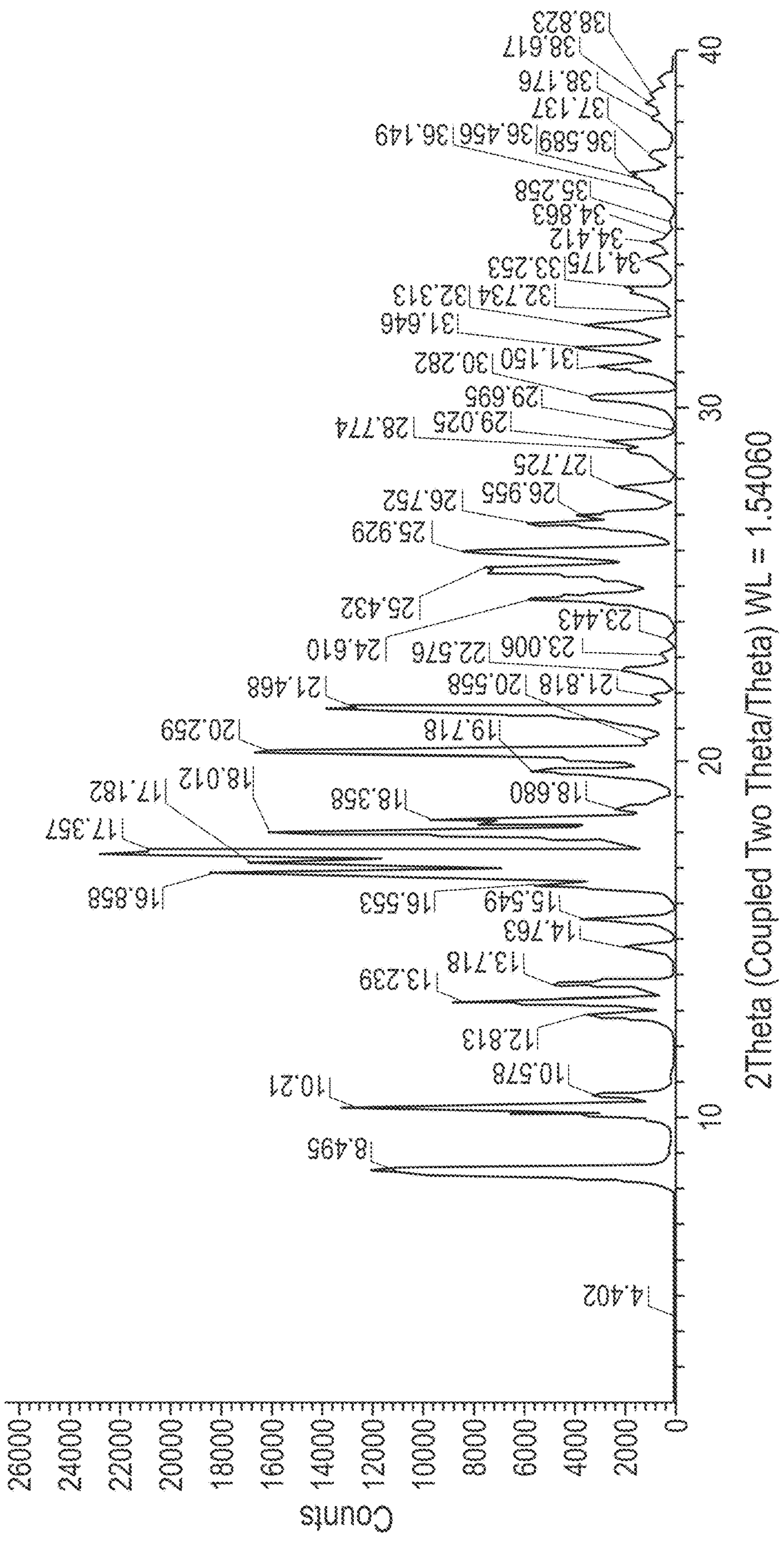
FIG. 1 illustrates powder X-ray diffraction (PXRD) pattern of L-glufosinate quinine tetrahydrate salt prepared according to present invention.

Those skilled in art will be aware that invention described herein is subject to variations and modifications other than those specifically described. It is to be understood that the invention described herein includes all such variations and modifications. The invention also includes all such steps, features, compositions and methods referred to or indicated in this specification, individually or collectively, and any and all combinations of any two or more said steps or features.

Definitions

For convenience, before providing further description of the present invention, certain terms employed in the specification, examples are described here. These definitions should be read in light of the remainder of the disclosure and understood as by a person of skill in the art. Unless defined otherwise, all technical and scientific terms used herein have the same meaning as commonly understood by a person of ordinary skill in the art. The terms used throughout this specification are defined as follows, unless otherwise limited in specific instances.

The terms used herein are defined as follows.

The term "room temperature" unless stated otherwise, essentially means temperature in a range of 20-35° C.

The term "purity" means purity as determined by HPLC ("High Pressure Liquid Chromatography").

The term "about" shall be interpreted to mean "approximately" or "reasonably close to" and any statistically insignificant variations therefrom.

As used herein, the terms "comprising" "including," "having," "containing," "involving," and the like are to be understood to be open-ended, i.e., to mean including but not limited to.

The terms "preferred" and "preferably" refers to embodiments of the invention that may afford certain benefits, under certain circumstances. In an embodiment, the aspects and embodiments described herein shall also be interpreted to replace the clause "comprising" with either "consisting of" or with "consisting essentially of" or with "consisting substantially of".

The term "glufosinate" shall be interpreted to mean racemic mixture of D & L-glufosinate or a mixture of L-glufosinate acid and D-glufosinate acid, wherein the ratio of L-isomer to D-isomer is in the range of 10:90 to 90:10; or salts thereof.

Preferably, the mixture comprises L-glufosinate acid and D-glufosinate acid, wherein the ratio of L-isomer to D-isomer is in the range of 30:70 or 70:30.

As used herein, the term "L-glufosinate" includes the L-isomer of Glufosinate, a salt and an ester thereof. The L-isomer of glufosinate is a structural analogue of glutamate and, therefore, is a competitive inhibitor of the enzyme glutamine synthetase (GS) of bacteria and plants. The L-enantiomer of glufosinate acts by inhibition of glutamine synthetase thereby causing accumulation of toxic levels of ammonium ion and indirectly stopping photosynthesis. It is also known as phosphinothricin or (S)-2-amino-4-(hydroxy(methyl)phosphonoyl)butanoic acid. The term can generically refer to any form of L-glufosinate such as solvates, hydrates, esters, anhydrous form, polymorph forms, pseudo polymorph forms, amorphous form or mixture thereof, and sodium, potassium or ammonium salts. The salts of L-glufosinate such as monosodium salt, disodium salt, monopotassium salt, dipotassium salt, calcium salt, ammonium salt, $—NH_3(CH_3)^+$ salt, $—NH_2(CH_3)^{2+}$ salt, $—NH(CH_3)^{3+}$ salt, $—NH(CH_3)_2(C_2H_4OH)^+$ salt, and $—NH_2(CH_3)(C_2H_4OH)^+$ salt are included in the definition. The agronomically acceptable salts include L-glufosinate-ammonium, L-glufosinate-sodium, and L-glufosinate-potassium. The term may also refer to an isomeric (racemic) mixture of L-glufosinate, D-glufosinate and salts thereof, wherein the content of L-glufosinate in the mixture is 70% or greater, preferably 80% or greater and more preferably 90% or greater. Typically, the ratio of L-glufosinate:D-glufosinate can be in the range from about 90:10 to about 99.9:0.1, preferably from about 95:5 to about 99.9:0.1.

The term “solid L-glufosinate salt” as used herein can generically refer to any form of L-glufosinate salt such as solvates, hydrates, anhydrous form, polymorph forms, pseudo polymorph forms, amorphous form or mixture thereof.

Many processes for preparation of solid forms of L-glufosinate salt are known in the literature, however in these processes, solids handling procedures such as crystallization or precipitation or filtration are required for isolating L-glufosinate salt. These procedures are not only time-consuming but also result in loss of yield of active ingredient in significant amount. Also, in the conventionally known processes, recovery of chiral base from organic solvent requires distillation at high temperature. It is a possibility that the chiral base used in process may get degraded at this high temperature leading to formation of impurities. To overcome the problems associated with the prior art processes, the inventors of the present invention have developed a method for obtaining L-glufosinate directly from racemic glufosinate without requiring the step of isolation of solid L-glufosinate salt. Also, in this developed process, there is a method for easy recovery of the chiral base used. Thereby, making the process economical and practical at industrial scale.

According to an aspect of present invention, there is provided a method for obtaining L-glufosinate or salts thereof from racemic glufosinate without requiring isolation of solid L-glufosinate salt.

According to an aspect of present invention, there is provided a method for obtaining L-glufosinate, said method comprising separating L-glufosinate from a salt of L-glufosinate and a chiral base.

According to yet another aspect of present invention, there is provided a method for obtaining L-glufosinate, wherein the method proceeds via a salt of L-glufosinate and a chiral base.

In an embodiment, the salt of L-glufosinate and the chiral base is prepared by reacting racemic glufosinate or its salt with a chiral base.

In an embodiment, L-glufosinate is separated from a salt of L-glufosinate and a chiral base by dissolving the salt of L-glufosinate and the chiral base in water and adjusting pH to 6 to 9 with a base to precipitate the chiral base; and removing the precipitated chiral base.

According to an aspect of present invention, there is provided a method for obtaining L-glufosinate, wherein said process proceeds via a salt of L-glufosinate and chiral base.

According to an aspect of present invention, there is provided a process for preparing L-glufosinate said process comprising precipitating a chiral base from a salt of L-glufosinate and chiral base.

In another aspect of present invention, there is provided a process for preparing L-glufosinate said process comprising reacting racemic glufosinate or its salt with a chiral base to obtain a salt of L-glufosinate and chiral base and precipitating a chiral base from the salt of L-glufosinate and chiral base.

According to an aspect of present invention, there is provided a method for obtaining L-glufosinate or its salt, said method comprising:

a) reacting racemic glufosinate or its salt with a chiral base to obtain a salt of L-glufosinate and chiral base;
b) dissolving said salt of L-glufosinate and chiral base in water and adjusting pH to 6 to 9 with a base to precipitate the chiral base; and
c) removing said precipitated chiral base to obtain L-glufosinate or salts thereof.

According to an embodiment, a racemic glufosinate acid form can be used in step a).

According to another embodiment, a racemic glufosinate salt such as monosodium salt, disodium salt, monopotassium salt, dipotassium salt, calcium salt, ammonium salt, —$NH_3(CH_3)^+$ salt, —$NH_2(CH_3)_2^+$ salt, —$NH(CH_3)_3^+$ salt, —$NH(CH_3)_2(C_2H_4OH)^+$ salt, —$NH_2(CH_3)(C_2H_4OH)^+$ salt or the likes, is used in step a).

According to another embodiment, the chiral base used in the process is substantially water insoluble. Examples of chiral base include brucine, quinine, cinchonine, cinchonidine, strychnine or isomers thereof and the like.

Preferably, the chiral base used is quinine base.

According to another embodiment, the step a) is carried out in presence of a catalyst and a solvent.

According to an embodiment, the catalyst used may be an aldehyde such as fomaldehyde, propionaldehyde, butyraldehyde, Heptanal, Acrylaldehyde, benzaldehyde, salicyladehyde, p-hydroxybenzaldehyde, o-nitrobenzaldehyde, 2-hydroxy-5-nitrobenzaldehyde, 2-hydroxy-3,5-dinitrobenzaldehyde, 5-nitrosalicylaldehyde, furfural and the like.

Preferably, the catalyst such as 2-hydroxy-3,5-dinitrobenzaldehyde or 2-hydroxy-5-nitrobenzaldehyde is used.

According to an embodiment, catalyst used is 2-hydroxy-3,5-dintrobenzaldehyde.

According to an embodiment, the amount of catalyst used is in the range of 0.05 to 1 mole per mole of racemic glufosinate or its salt used.

According to an embodiment, the solvent used in step a) is selected from alcohol such as methanol, ethanol, n-propanol. iso-propanol, n-butanol, iso-butanol, sec-butanol and tert-butanol, ketones such as acetone, methyl ethyl ketone, methyl isobutyl ketone and N-methylpyrrolidone, water or mixture thereof.

Preferably, the solvent used in step a) is iso-propanol or tert-butanol in combination with water.

In an embodiment, the solvent is used in the ratio ranging from 10:90 to 15:85 volumes of water:alcohol.

According to an embodiment, the solvent used in step a) is tert-butanol in combination with water.

The ratio of water and tert-butanol is in the range from 10:90 to 15:85 volumes.

According to an embodiment, step a) of reacting glufosinate or its salt with a chiral base to obtain a salt of L-glufosinate and chiral base is carried out at temperature ranging from 20 to 100° C. In an embodiment the step a) is carried out preferably at temperature 40 to 80° C.

According to an embodiment, the step a) may further comprise isolating the salt of L-glufosinate and chiral base by gradually cooling the reaction mixture at temperature range from 0 to 30° C., preferably 0 to 20° C.

According to an embodiment, the step b) of dissolving salt of L-glufosinate and chiral base in water and adjusting pH to 6 to 9 with a base to precipitate the chiral base, wherein the base such as alkali or alkaline earth metal hydroxides, alkali metal or alkaline earth metal carbonates, alkaline earth metal oxides, ammonia, or amines can be used.

In an embodiment the step b) is carried out at temperature range from about 20 to 80° C.

Base such as sodium hydroxide, potassium hydroxide, ammonium hydroxide, calcium hydroxide, ammonia, sodium carbonate, sodium bicarbonate, potassium carbonate, potassium bicarbonate, calcium carbonate, calcium bicarbonate, calcium oxide, ammonia or amines can be used.

According to an embodiment, the base used is ammonia.

According to an embodiment, ammonia or gaseous ammonia is used as base.

According to an embodiment, the steps b) & c) of the process do not involve the use of an organic solvent.

According to an embodiment, the step c) of removing precipitated chiral base to obtain L-glufosinate wherein the chiral base precipitated out may be isolated by means well-known to those skilled in the art, i.e., filtration, centrifugation and the like.

The salt of L-glufosinate obtained in the step c) can be monosodium salt, disodium salt, monopotassium salt, dipotassium salt, calcium salt, ammonium salt, $—NH_3(CH_3)^+$ salt, $—NH_2(CH_3)_2^+$ salt, $—NH(CH_3)_3^+$ salt, $—NH(CH_3)_2(C_2H_4OH)^+$ salt, $—NH_2(CH_3)(C_2H_4OH)^+$ salt or the likes.

According to an embodiment, the salt of L-glufosinate obtained in the step c) is ammonium salt.

According to an embodiment, the concentration of aqueous L-glufosinate salt solution may be adjusted as per requirement.

According to a preferred embodiment, the concentration of aqueous L-glufosinate salt solution is in the range of 30-80%.

According to an embodiment, the L-glufosinate obtained according to the present method can be used directly in the preparation of agrochemical formulations.

Accordingly, in an aspect, the present invention provides an agrochemical composition comprising L-glufosinate prepared via a salt of L-glufosinate and chiral base, and an agrochemically acceptable excipient.

In another aspect, the present invention provides an agrochemical composition comprising L-glufosinate prepared via the L-glufosinate quinine tetrahydrate salt, and an agrochemically acceptable excipient.

In another aspect, the present invention provides an agrochemical composition comprising L-glufosinate ammonium prepared via the L-glufosinate quinine tetrahydrate salt, and an agrochemically acceptable excipient.

Accordingly, in another aspect, the present invention provides a process for preparing an agrochemical composition, said process comprising preparing L-glufosinate or its salt via a salt of L-glufosinate and chiral base, and adding an agrochemically acceptable excipient.

In another aspect, the present invention provides a process for preparing an agrochemical composition, said process comprising preparing L-glufosinate via the L-glufosinate quinine tetrahydrate salt, and adding an agrochemically acceptable excipient.

According to an embodiment, the L-glufosinate is obtained in the form of concentrated aqueous L-glufosinate salt solution and handling of moisture sensitive solid L-glufosinate salt is avoided completely.

According to an embodiment, the method of the present invention achieves dynamic kinetic resolution of a racemic glufosinate or its salt i.e., a kinetic resolution wherein the yield of the resolved enantiomer, exceeds the amount present in the original mixture due to the in situ equilibration of the enantiomers under the reaction conditions prior to the resolution step. An advantage of the dynamic kinetic resolution methods is that yield losses associated with the presence of an undesired enantiomer or diastereomer can be substantially reduced or eliminated altogether.

The present invention for providing aqueous L-glufosinate salt solution doesn't involve solid handling steps such as crystallization or precipitation or filtration of L-glufosinate salt, thereby reducing the possibility of loss of yield.

According to an embodiment, there is provided a method for obtaining L-glufosinate, said method comprising:

a) reacting glufosinate or its salt with a chiral base to obtain a salt of L-glufosinate and chiral base;
b) dissolving the salt of L-glufosinate and chiral base in water and adjusting pH to 6 to 9 with a base to precipitate the chiral base; and
c) removing the precipitated chiral base and obtaining L-glufosinate or its salt.

In an embodiment, the L-glufosinate quinine tetrahydrate salt is prepared by reacting glufosinate with quinine; wherein the glufosinate used is a mixture of L-glufosinate acid and D-glufosinate acid, wherein the ratio of L-isomer to D-isomer is in the range of 10:90 to 90:10; or salts thereof.

Preferably, the mixture of L-glufosinate acid and D-glufosinate acid, wherein the ratio of L-isomer to D-isomer is in the range of 30:70 or 70:30.

According to an aspect of present invention, there is provided a method for obtaining L-glufosinate wherein said method proceeds via the L-glufosinate quinine tetrahydrate salt.

According to an aspect of present invention, there is provided a method for obtaining L-glufosinate ammonium wherein said method proceeds via the L-glufosinate quinine tetrahydrate salt.

According to an aspect of present invention, there is provided a process for preparing L-glufosinate, said process comprising precipitating out quinine from the L-glufosinate quinine tetrahydrate salt.

In another aspect of present invention, there is provided a process for preparing L-glufosinate, said process comprising reacting racemic glufosinate or its salt with quinine to obtain the L-glufosinate quinine tetrahydrate salt, and precipitating out quinine from the L-glufosinate quinine tetrahydrate salt to obtain L-glufosinate.

According to an aspect of present invention, there is provided a method for obtaining L-glufosinate, said method comprising separating L-glufosinate from L-glufosinate quinine tetrahydrate salt.

In an embodiment, the L-glufosinate quinine tetrahydrate salt is prepared by reacting racemic glufosinate or its salt with quinine.

In an embodiment, L-glufosinate is separated from L-glufosinate quinine tetrahydrate salt by dissolving the L-glufosinate quinine salt in water and adjusting pH to 6 to 9 with a base to precipitate quinine; and removing the precipitated quinine.

In an embodiment, L-glufosinate is separated in the form of a concentrated aqueous L-glufosinate salt solution.

According to an aspect of present invention, there is provided a method for obtaining L-glufosinate or its salt, said method comprising:

a) reacting racemic glufosinate or its salt with quinine to obtain L-glufosinate quinine tetrahydrate salt;
b) dissolving L-glufosinate quinine tetrahydrate salt in water and adjusting pH to 6 to 9 with a base to precipitate out quinine; and
c) removing the precipitated quinine and obtaining L-glufosinate.

In an embodiment, L-glufosinate or its salt is obtained as concentrated aqueous L-glufosinate salt solution.

According to an embodiment, the quinine used in step a) of the process is separated after completion of the reaction in step c) and can be used again in the inventive method, i.e. the quinine is recyclable.

The recovered quinine is in good enantiomeric excess and yield, and it can be recycled for more than 5 times in the process. Thus, present process is economically and industrially viable.

The present invention provides a method for obtaining L-glufosinate wherein the precipitation of quinine salt and formation of L-glufosinate salt takes place at the same time after addition of base to adjust pH. The quinine salt precipitated can be separated by filtration and the filtrate obtained comprises desired L-glufosinate or its salt. This adaptation in process focusing on the difference in solubility of quinine and L-glufosinate salt in water reduces the number of operational steps and making the process more economical and efficient.

According to another aspect of present invention, there is provided a method for obtaining L-glufosinate ammonium, said method comprising:

a) reacting racemic glufosinate or its salt with quinine in presence of catalyst and a solvent to obtain L-glufosinate quinine tetrahydrate salt;
b) dissolving L-glufosinate quinine tetrahydrate salt in water and adjusting pH to 6 to 9 with ammonia to precipitate quinine; and
c) removing the precipitated quinine and obtaining L-glufosinate ammonium solution.

According to an embodiment, there is provided a method for obtaining L-glufosinate salt, said method comprising:

a) reacting glufosinate or its salt with quinine in presence of 2-hydroxy-3,5-dintrobenzaldehyde and a solvent to obtain L-glufosinate quinine tetrahydrate salt;
b) dissolving L-glufosinate quinine tetrahydrate salt in water and adjusting pH to 6 to 9 with ammonia to precipitate quinine;
c) removing the precipitated quinine and obtaining L-glufosinate salt.

In an embodiment the L-glufosinate salt obtained is a L-glufosinate ammonium salt.

According to an embodiment, there is provided a method for obtaining L-glufosinate salt, said method comprising:

a) reacting racemic glufosinate or its salt with quinine in presence of a catalyst and a solvent to obtain L-glufosinate quinine tetrahydrate salt;
b) dissolving L-glufosinate quinine tetrahydrate salt in water and adjusting pH to 6 to 9 with a base to precipitate quinine;
c) removing the precipitated quinine and obtaining L-glufosinate or its salt; and
d) isolating the solid L-glufosinate salt.

According to an embodiment, there is provided a method for obtaining L-glufosinate salt, said method comprising:

a) reacting glufosinate or its salt with quinine in presence of 2-hydroxy-3,5-dintrobenzaldehyde and a solvent to obtain L-glufosinate quinine tetrahydrate salt;
b) dissolving L-glufosinate quinine tetrahydrate salt in water and adjusting pH to 6 to 9 with ammonia to precipitate quinine;
c) removing the precipitated quinine and obtaining L-glufosinate; and
d) isolating the solid L-glufosinate salt.

According to an embodiment, the isolation of L-glufosinate salt can be carried out by conventionally known process, for example by evaporation to dryness, addition of anti-solvent and the like.

According to another aspect of present invention, there is provided a method for obtaining L-glufosinate quinine tetrahydrate salt, said method comprising:

a) reacting racemic glufosinate or its salt with quinine in presence of catalyst and a solvent consisting of mixture of water and tert-butanol; and
b) cooling the reaction mixture and isolating the L-glufosinate quinine tetrahydrate salt.

According to an embodiment, the ratio of water:tert-butanol used is in the range of 10:90 to 15:85 volumes.

While performing the experiments, the inventors of present invention observed that when L-glufosinate is separated from racemic glufosinate by treatment with quinine, various L-glufosinate quinine hydrates are formed such as dihydrate, tetrahydrate, hexahydrate, dodecahydrate and so on. These various hydrates have different physical and chemical properties. Some of these hydrates may absorb moisture from atmosphere or may lose water molecule by dehydration and hence are unstable for long term storage.

On comprehensive study and analysis, the inventors of present invention found that the L-glufosinate quinine tetrahydrate salt has improved storage stability, thermal stability and non-hygroscopicity as compared to other hydrates.

The method described herein does not require any special techniques and purification operations and may be carried out in any conventional industrial chemical plant.

According to yet another aspect of present invention, there is provided L-glufosinate quinine tetrahydrate salt.

The L-glufosinate quinine tetrahydrate salt can exhibit desirable stability on storage at ambient conditions and air atmosphere for more than 430 days.

According to yet another aspect of the present invention, there is provided L-glufosinate quinine tetrahydrate salt, further characterized by having $D_{50}$ particle size value of less than 45 μm, preferably less than 30 μm.

According to yet another aspect of the present invention, there is provided L-glufosinate quinine tetrahydrate salt, having bulk density of about 0.3 gm/ml to about 0.7 gm/ml.

According to another aspect of present invention, there is provided L-glufosinate quinine tetrahydrate salt characterized by a powder X-ray diffraction (PXRD) pattern or a thermogravimetric analysis curve (TGA).

According to an embodiment of the present invention, there is provided L-glufosinate quinine tetrahydrate salt characterized by powder X-ray diffraction (PXRD) pattern as represented in FIG. 1.

According to an embodiment of the present invention, the L-glufosinate quinine tetrahydrate salt characterised by powder X-ray diffraction (PXRD) pattern comprises at least three peaks as shown in FIG. 1.

According to an embodiment, there is provided L-glufosinate quinine tetrahydrate salt characterised by powder X-ray diffraction (PXRD) pattern comprises at least three peaks selected from values 8.49°, 10.21°, 10.57°, 12.81°, 13.23°, 13.71°, 14.76°, 15.54°, 16.55°, 16.85°, 17.18°, 17.35°, 18.01°, 18.35°, 18.68°, 19.71°, 20.25°, 21.46°, 22.57°, 24.61°, 25.43°, 25.92°, 26.75°, 26.95°, 27.72°, 28.77°, 29.02°, 30.28°, 31.15°, 31.64°, 32.31° and 33.25° 2θ±0.2°.

Figure 2:
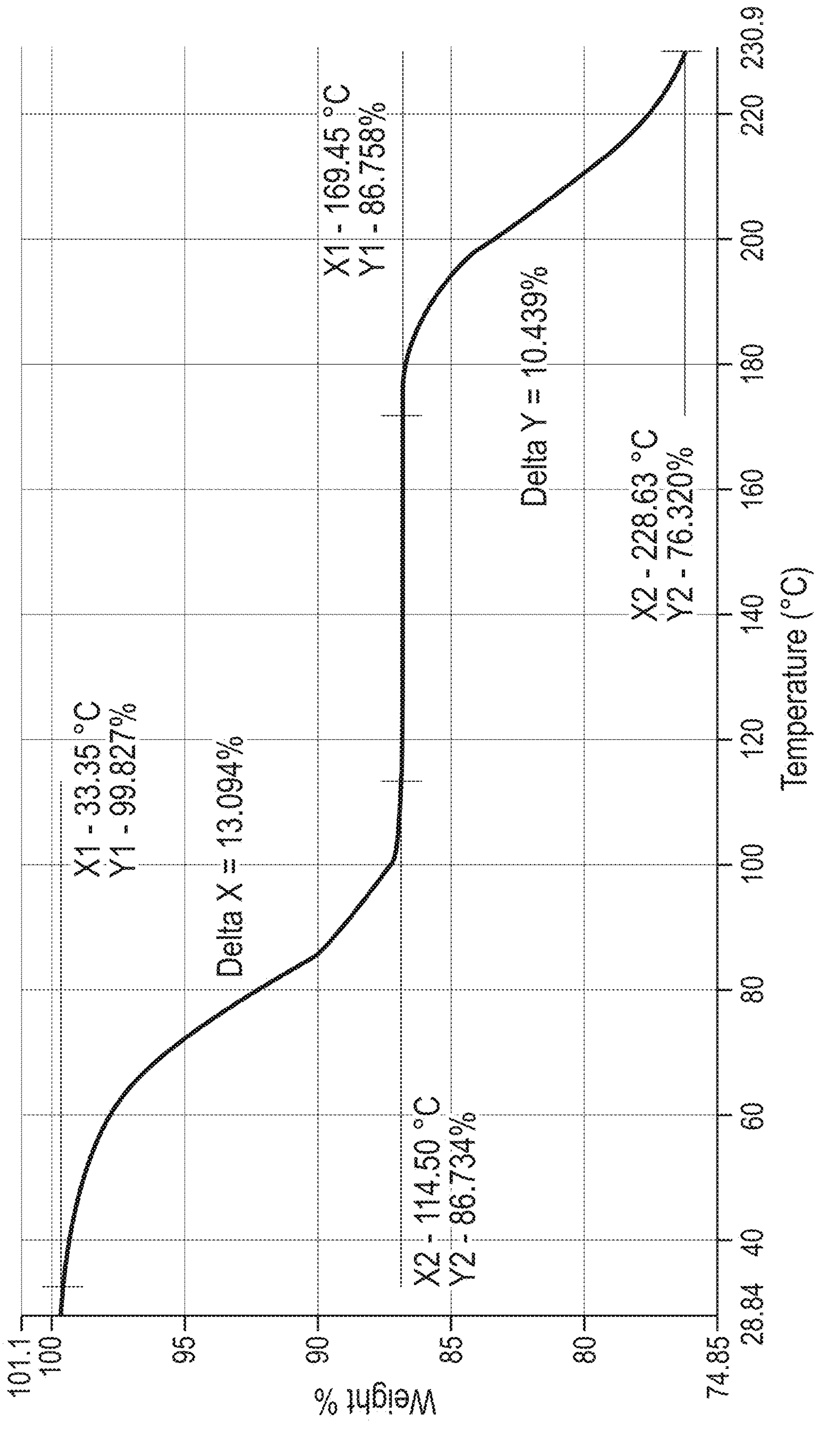
FIG. 2 illustrates Thermogravimetric analysis (TGA) curve of L-glufosinate quinine tetrahydrate salt prepared according to present invention, illustrated by reference to example 1.

According to an embodiment of present invention, the L-glufosinate quinine tetrahydrate salt characterized by thermogravimetric analysis curve (TGA) as represented by FIG. 2.

The TGA curve of L-glufosinate quinine tetrahydrate salt in FIG. 2 shows a weight loss of about 13% (from about 30° C. up to about 118° C.) which corresponds to 4 moles of water per mole of L-glufosinate quinine salt re-confirming that the salt is a tetrahydrate.

According to an embodiment, the present invention provides an agrochemical composition comprising L-glufosinate ammonium prepared via the L-glufosinate quinine tetrahydrate salt, and an agrochemically acceptable excipient.

In an embodiment the agrochemical composition comprising L-glufosinate or L-glufosinate ammonium prepared via the L-glufosinate quinine tetrahydrate salt from 1 to 99% by weight of the total composition and an agrochemically acceptable excipient from 1 to 50% by weight of the total composition.

In an embodiment, the agronomically acceptable excipients can be selected from, but not limited to, surfactants, solvent, fertilizer, pH modifiers, crystallization inhibitors, viscosity modifiers, suspending agents, spray droplet modifiers, pigments, antioxidants, foaming agents, light-blocking agents, compatibilizing agents, antifoam agents, sequestering agents, neutralizing agents, corrosion inhibitors, dyes, odorants, spreading agents, penetration aids, micronutrients, emollients, lubricants, sticking agents, dispersing agents, thickening agents, freezing point depressants, antimicrobial agents, and the like.

According to an embodiment of present invention, the dispersion comprising single isomer of glufosinate salt and at least one organic solvent may further comprise a surfactant.

The surfactants used in the process may be selected from anionic, cationic or zwitterionic and/or non-ionic surface-active compounds (surfactants) or combinations thereof.

Examples of anionic surfactants include: anionic derivatives of fatty alcohols having 10-24 carbon atoms in the form of ether carboxylates, sulfonates, sulfates, and phosphates, and their inorganic salts (e.g., alkali metal and alkaline earth metal salts) and organic salts (e.g., salts based on amine or alkanolamine); anionic derivatives of copolymers consisting of EO (ethylene oxide), PO (propylene oxide) and/or BO (butylene oxide) units, in the form of ether carboxylates, sulfonates, sulfates, and phosphates, and their inorganic salts (e.g., alkali metal and alkaline earth metal salts) and organic salts (e.g., salts based on amine or alkanolamine); derivatives of alkylene oxide adducts of alcohols, in the form of ether carboxylates, sulfonates, sulfates and phosphates, and their inorganic salts (e.g., alkali metal and alkaline earth metal salts) and organic salts (e.g., salts based on amine or alkanolamine); derivatives of fatty acid alkoxylates, in the form of ether carboxylates, sulfonates, sulfates and phosphates, and their inorganic salts (e.g., alkali metal and alkaline earth metal salts) and organic salts (e.g., salts based on amine or alkanolamine); alkyl ether phosphate, sulfosuccinate & its derivatives, sulfosuccinate half ester, alkyl sulfosuccinate mono ester and diester salts.

Examples of cationic or zwitterionic surfactants may be selected from alkylene oxide adducts of fatty amines, quaternary ammonium compounds having 8 to 22 carbon atoms ($C_8$-$C_{22}$), surface-active zwitterionic compounds such as taurides, betaines and sulfobetaines.

Examples of non-ionic surfactants are: alkylpolyglycosides, alkyl glucamide, alkyl amine oxides having $C_8$ to $C_{20}$ carbon atoms, alcohol ethoxylate, fatty acid methyl ester, sorbitan ester and ethoxylated sorbitan ester, ethoxylated alkylphenol, ethoxylated tristyrylphenol and alkyl amide, fatty alcohols having 10-24 carbon atoms with 0-60 EO and/or 0-20 PO and/or 0-15 BO in any order; fatty acid alkoxylates and triglyceride alkoxylates; fatty acid amide alkoxylates; alkylene oxide adducts of alkynediols; sugar derivatives such as amino sugars and amido sugars; polyacrylic and polymethacrylic derivatives; polyamides such as modified gelatins or derivatized polyaspartic acid; surfactant polyvinyl compounds such as modified PVP; polyol-based alkylene oxide adducts; polyglycerides and derivatives thereof.

In an aspect the present invention provides use of present composition prepared according to the present invention to control harmful/undesired plants.

In an embodiment the present invention provides use of present composition comprising L-glufosinate or its salts prepared according to the present invention optionally with other auxiliary ingredients to control harmful/undesired plants.

The abovementioned compositions provide effective weed control to keep agricultural crops free from undesired competing plants and thus to safeguard and/or increase the yields from the qualitative and quantitative point of view.

The compositions of the present invention maybe used to target weeds among the crops such corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, Prunus mume, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., tea, nut and vine crops, crops such as coconut, coffee, cocoa trees other than fruit trees; tea, mulberry, flowering plant, trees such as ash, birch, dogwood, Eucalyptus, *Ginkgo biloba*, lilac, maple, Quercus, poplar, Judas tree, *Liquidambar formosana*, plane tree, *zelkova*, Japanese arborvitae, fir wood, hemlock, juniper, *Pinus, Picea*, and *Taxus* cuspidate, etc.

The target weeds may be selected from *Alopecurus myosuroides* Huds. (blackgrass, ALOMY), *Amaranthus palmeri* (Palmer amaranth, AMAPA) *Amaranthus viridis* (slender amaranth, AMAVI), *Avena fatua* (wild oat, AVEFA), *Brachiaria decumbens* Stapf. or *Urochloa decumbens* (Stapf), *Brachiaria brizantha* or *Urochloa brizantha, Brachiaria platyphylla* (Groseb.) Nash or *Urochloa platyphylla* (broadleaf signalgrass, BRAPP), *Brachiaria plantaginea*. or *Urochloa plantaginea* (alexandergrass, BRAPL), *Cenchrus echinatus* (southern sandbur, CENEC), *Digitaria horizontalis* Willd. (Jamaican crabgrass, DIGHO), *Digitaria insularis* (sourgrass, TRCIN), *Digitaria sanguinalis* (large crabgrass, DIGSA), *Echinochloa crus-galli* (barnyardgrass, ECHCG), *Echinochloa colonum* (junglerice, ECHCO), *Eleusine indica* Gaertn. (goosegrass, ELEIN), *Lolium multiflorum* Lam. (Italian ryegrass, LOLMU), *Panicum dichotomiflorum* Michx. (fall *panicum*, PANDI), *Panicum miliaceum* L. (wild-proso millet, PANMI), *Sesbania exaltata* (hemp *sesbania*, SEBEX), *Setaria faberi* Herrm. (giant foxtail, SETFA), *Setaria viridis* (green foxtail, SETVI), *Sorghum halepense* (Johnsongrass, SORHA), *Sorghum bicolor*, Moench ssp., *Arundinaceum* (shattercane, SORVU), *Cyperus esculentus* (yellow nutsedge, CYPES), *Cyperus rotundus* (purple nutsedge, CYPRO), *Abutilon theophrasti* (velvetleaf, ABUTH), *Amaranthus* species (pigweeds and amaranths, AMASS), *Ambrosia artemisiifolia* L. (common ragweed, AMBEL), *Ambrosia psilostachya* DC. (western ragweed, AMBPS), *Ambrosia trifida* (giant ragweed, AMBTR), *Anoda cristata* (spurred *anoda*, ANVCR), Asclepias *syriaca* (common milkweed, ASCSY), *Bidens pilosa* (hairy beggarticks, BIDPI), Borreria species (BOISS), Borreria *alata* or Spermacoce *alata* Aubl. or Spermacoce *latifolia* (broadleaf buttonweed, BOILF), *Chenopodium album* L. (common lambsquarters, CHEAL), *Cirsium arvense* (Canada thistle, CIRAR), *Commelina benghalensis* (tropical spiderwort, COMBE), *Datura stramonium* (jimsonweed, DATST), *Daucus carota* (wild carrot, DAUCA), *Euphorbia heterophylla* (wild poinsettia, EPHHL), *Euphorbia hirta* or Chamaesyce *hirta* (garden spurge, EPHHI), *Euphorbia dentata* Michx. (toothed spurge, EPHDE), Erigeron *bonariensis* or *Conyza bonariensis* (hairy fleabane, ERIBO), Erigeron *canadensis* or *Conyza canadensis* (horseweed, ERICA), *Conyza sumatrensis* (tall fleabane, ERIFL), *Helianthus annuus* (common sunflower, HELAN), Jacquemontia tamnifolia (smallflower morningglory, IAQTA), *Ipomoea hederacea* (ivyleaf morningglory, IPOHE), *Ipomoea lacunosa* (white morningglory, IPOLA), *Lactuca serriola* (prickly lettuce, LACSE), *Portulaca oleracea* (common purslane, POROL), Richardia species (pusley, RCHSS), *Salsola* tragus (Russian thistle, SASKR), *Sida* species (*sida*, SIDSS), *Sida spinosa* (prickly *sida*, SIDSP), *Sinapis arvensis* (wild mustard, SINAR), *Solanum* ptychanthum (eastern black nightshade, SOLPT), Tridax *procumbens* (coat buttons, TRQPR), *Rumex dentatus* (RUMDE) or *Xanthium strumarium* (common cocklebur, XANST).

In another embodiment the present invention provides a method of controlling undesired plants by applying the present compositions comprising L-glufosinate or L-glufosinate ammonium prepared according to the present invention.

In an embodiment, the composition of the present invention may be applied to the locus either simultaneously or sequentially, such that the herbicide may be applied in a tank mix or as a pre-mixed composition.

In an embodiment, the present invention may be applied either pre or post emergent.

The method of control of the present invention may be carried out by spraying the suggested tank mixes or may be formulated as a kit-of-parts containing various components that may be mixed as instructed prior to spraying.

According to an embodiment of the present invention, there is provided a kit comprising present composition for controlling harmful plants.

The method for obtaining L-glufosinate ammonium solution according to the invention is ascertained by the experiments as exemplified below. These examples are merely illustrations and are not to be understood as limiting the scope and underlying principles of the invention in any way. Indeed, various modifications of the invention in addition to those shown and described herein will become apparent to those skilled in the art from the following examples and foregoing description.

EXAMPLES

General Experimental Conditions:

XRPD: X-ray powder diffraction method (XPRD) pattern was carried out on Instrument: Bruker make 2nd generation D2 Phaser Powder X-Ray diffractometer; Operated at: 30.0 kV, 10 mA; Radiation: Cu Kα; Wavelength: 1.54060° A, with scanning range between 4-40 2θ (Step size: 0.02°).

TGA: Thermogravimetric (TG) analyses were carried out Instrument: Pyris 6 THA, Perkin Elmer. Method: Heating the sample from 30° C. to 250° C. at 5° C./min HPLC method:

A) Column—Zorbax SB-C8 (250×4.6 mm i.d., 5 micron)
B) Mobile Phase—0.1% OPA:Acetonitrile (v/v) 40:60
C) Flow—1.0 ml/min.
D) UV-Wavelength—230 nm
E) Injection volume—5 μl
F) Column temperature 40° C.
G) Run time—10 min

Example 1

To a mixture of 54 ml of water and 396 ml of tertiary-butanol was added 30 g of racemic mixture of glufosinate (93.3% purity) followed by addition of 54 g of (−) quinine, the reaction mixture obtained was heated under stirring for 1 hour at 70° C. to get clear solution. The clear solution was cooled to 50° C. and 3.52 g of 2-hydroxy-3,5-dintrobenzaldehyde was added to result in a yellow suspension. The suspension was stirred for 36 hours at 50° C., the suspension was then cooled gradually at 15° C. under stirring. The resultant solid was filtered to get wet cake, the wet cake was washed with mixture of tertiary-butanol and water and dried to obtain about 75 g of L-glufosinate quinine tetrahydrate salt (about 78% yield).

Particle Size Distribution: $D_{10}$=10.11 μm; $D_{50}$=21.90 μm and $D_{90}$=42.79 μm
Bulk density: 0.4936 gm/ml
L-glufosinate acid content: 32.70% (by HPLC)
Quinine content: 54.34% (by HPLC)
Loss on drying: 12.32%
Moisture content: 12.04%
Chiral ratio: 93.7:6.3 (L-glufosinate:D-glufosinate)
Sample was then analysed by TGA. FIG. 2 is the TGA of thus obtained L-glufosinate quinine tetrahydrate salt.

Example 2

75 g of L-glufosinate quinine tetrahydrate salt was dissolved in 450 ml of distilled water by stirring at 28-30° C. to get a clear solution. The pH of clear solution was adjusted to about 9 using 22-25% aqueous ammonia solution. It was observed that during addition of aqueous ammonia solution, (−) quinine precipitated out. The (−) quinine was filtered out and dried to get 40.32 g (−) quinine having optical rotation −166°.

The filtrate obtained was washed with methylene chloride to remove traces of quinine and to get concentrated aqueous L-glufosinate ammonium solution.

L-glufosinate ammonium content: 53.73% (by HPLC assay)

Example 3

The aqueous solution obtained in example 2, was evaporated to dryness under vacuum at 50-60° C. To the crude L-glufosinate ammonium obtained was washed with methanol to remove traces of water and obtain 22 g of L-glufosinate ammonium (94% yield).

Example 4

L-glufosinate quinine tetrahydrate salt obtained in example 1 was stored under standard conditions (i.e. room temperature, normal pressure, air atmosphere) for 431 days. Sample was then analysed by HPLC L-glufosinate acid content: 33.13% (by HPLC)
Quinine content: 53.14% (by HPLC)

Loss on drying: 12.27%
Moisture content: 12.39%
Chiral ratio: 93:07 (L-glufosinate:D-glufosinate)

Example 5

To a mixture of 40 ml of water and 297 ml of tertiary-butanol was added 22.5 g of racemic mixture of glufosinate followed by addition of 40 g of recovered (−) quinine (from example 2), the reaction mixture obtained was heated under stirring for 1 hour at 70° C. to get clear solution. The clear solution was cooled to 50° C. and 2.63 g of 2-hydroxy-3,5-dintrobenzaldehyde was added to result in a yellow suspension. The suspension was stirred for 36 hours at 50° C., the suspension was then cooled to gradually to 15° C. under stirring. The resultant solid was filtered to get wet cake, the wet cake was washed with mixture of tertiary-butanol and water and dried to obtain 54.3 g of L-glufosinate quinine tetrahydrate salt (76% yield).

L-glufosinate acid content: 32.2% (by HPLC)
Quinine content: 54.1% (by HPLC)
Loss on drying: 12.3%
Moisture content: 11.9%
Chiral ratio: 93.5:6.5 (L-glufosinate:D-glufosinate)

Example 6

54.3 g of L-glufosinate quinine tetrahydrate salt was dissolved in 326 ml of distilled water by stirring at 28-30° C. to get a clear solution. The pH of clear solution was adjusted to about 9 using ammonia gas. It was observed that during purging of ammonia gas, (−) quinine precipitated out. The (−) quinine was filtered out and dried to get 30 g (−) quinine having optical rotation −167°.

The filtrate obtained was washed with methylene chloride to remove traces of quinine and to get concentrated aqueous L-glufosinate ammonium solution.

L-glufosinate ammonium content: 54.2% (by HPLC assay).

We claim:

1. A method for obtaining L-glufosinate or salts thereof, said method comprising:
a) reacting glufosinate or its salt with a chiral base to obtain a salt of L-glufosinate and the chiral base;
b) dissolving said salt of L-glufosinate and chiral base in water and adjusting pH to 6 to 9 with a base to precipitate the chiral base; and
c) removing said precipitated chiral base to obtain the L-glufosinate or salts thereof.

2. The method as claimed in claim 1, wherein said chiral base is substantially water insoluble.

3. The method as claimed in claim 2, wherein said chiral base is selected from group comprising of brucine, quinine, cinchonine, cinchonidine and strychnine and isomers thereof.

4. The method as claimed in claim 3, wherein said chiral base is quinine.

5. The method as claimed in claim 1, wherein the step a) is carried out in presence of a catalyst and a solvent.

6. The method as claimed in claim 5, wherein said catalyst is selected from group comprising of fomaldehyde, propionaldehyde, butyraldehyde, heptanal, acrylaldehyde, benzaldehyde, salicyladehyde, p-hydroxybenzaldehyde, o-nitrobenzaldehyde, 2-hydroxy-5-nitrobenzaldehyde, 2-hydroxy-3,5-dinitrobenzaldehyde, 5-nitrosalicylaldehyde and furfural.

7. The method as claimed in claim 5, wherein said solvent comprises an alcohol, a ketone, water or a mixture thereof.

8. The method as claimed in claim 7, wherein said solvent is mixture of tert-butanol and water.

9. The method as claimed in claim 8, wherein a ratio of water and tert-butanol is in a range from 10:90 to 15:85 volumes.

10. The method as claimed in claim 1 wherein step a) is carried out at a temperature from about 20 to about 100° C. and step b) is carried out at temperature from about 20 to about 80° C.

11. The method as claimed in claim 1, wherein in the step b) the base comprises an alkali or alkaline earth metal hydroxide, an alkali metal or alkaline earth metal carbonate, an alkaline earth metal oxide, ammonia, or an amine.

12. The method as claimed in claim 1, wherein said L-glufosinate is obtained as a concentrated aqueous L-glufosinate salt solution.

13. The method as claimed in claim 11, wherein
a) reacting the glufosinate or its salt the chiral base is with quinine in presence of a catalyst and a solvent to obtain a L-glufosinate quinine tetrahydrate salt;
b) dissolving said L-glufosinate quinine tetrahydrate salt in water and adjusting the pH to 6 to 9 is with ammonia to precipitate the quinine; and
c) removing said precipitated quinine to obtain a L-glufosinate ammonium solution.

14. The method of claim 1, further comprising adding an agrochemically acceptable excipient to provide a composition.

15. A method for obtaining L-glufosinate or salts thereof, said method comprising:
a) reacting glufosinate or its salt with quinine to obtain L-glufosinate quinine tetrahydrate salt;
b) dissolving said L-glufosinate quinine tetrahydrate salt in water and adjusting pH to 6 to 9 with a base to precipitate quinine; and
c) removing said precipitated quinine to obtain L-glufosinate or salts thereof.

16. The method as claimed in claim 15, wherein a ratio of water:tert-butanol is in the range of 10:90 to 15:85 volumes.

* * * * *